(12) United States Patent
Muthumani et al.

(10) Patent No.: US 8,011,537 B2
(45) Date of Patent: Sep. 6, 2011

(54) DISPENSING SYSTEM AND METHOD FOR DISPENSING FLUID IN AN APPLIANCE

(75) Inventors: Solomon Muthumani, Andhra Pradesh (IN); Jawahar Gopalan, Tirunelveli (IN); John Joseph Roetker, Louisville, KY (US); Toby Whitaker, Loveland, CO (US)

(73) Assignee: General Electric Company, Schenectady, NY (US)

( * ) Notice: Subject to any disclaimer, the term of this patent is extended or adjusted under 35 U.S.C. 154(b) by 813 days.

(21) Appl. No.: 11/967,807

(22) Filed: Dec. 31, 2007

(65) Prior Publication Data
US 2009/0165494 A1    Jul. 2, 2009

(51) Int. Cl.
*B65D 88/54* (2006.01)
(52) U.S. Cl. ............ 222/318; 222/1; 222/64; 222/146.6; 141/117; 141/120; 239/126; 62/393
(58) Field of Classification Search ................ 222/1, 52, 222/73, 146.1, 146.6, 64, 318; 141/115–127; 239/124–139; 62/389–391, 393
See application file for complete search history.

(56) References Cited

U.S. PATENT DOCUMENTS

| | | | |
|---|---|---|---|
| 3,014,620 A * | 12/1961 | Moore .......................... | 222/642 |
| 3,969,909 A | 7/1976 | Barto et al. | |
| 4,077,545 A | 3/1978 | Karls | |
| 4,207,994 A * | 6/1980 | Offlee, Sr. .................. | 222/146.1 |
| 4,391,459 A | 7/1983 | Wicke et al. | |
| 4,424,767 A | 1/1984 | Wicke et al. | |
| 4,432,556 A | 2/1984 | Green et al. | |
| 4,513,887 A | 4/1985 | Wicke et al. | |
| 4,646,528 A | 3/1987 | Marcade et al. | |
| 5,395,014 A | 3/1995 | Burrows | |
| 5,511,388 A | 4/1996 | Taylor et al. | |
| 5,855,120 A * | 1/1999 | Kim ................................ | 62/389 |
| 6,207,046 B1 | 3/2001 | Yamashita et al. | |
| 6,324,850 B1 | 12/2001 | Davis | |
| 6,622,509 B2 | 9/2003 | Stich et al. | |
| 6,847,782 B1 * | 1/2005 | Kovacs ......................... | 392/451 |
| 6,877,965 B2 | 4/2005 | McCall et al. | |
| 6,912,867 B2 | 7/2005 | Busick | |
| 7,028,725 B2 | 4/2006 | Hooker et al. | |
| 7,188,479 B2 | 3/2007 | Anselmino et al. | |
| 7,269,968 B2 | 9/2007 | Harder et al. | |
| 2003/0140964 A1 | 7/2003 | O'Donnell | |
| 2005/0063839 A1 | 3/2005 | Kasumasa | |
| 2005/0072178 A1 | 4/2005 | Park et al. | |

(Continued)

OTHER PUBLICATIONS

NPL-The Engineering Toolbox Webpage; Description of types of pumps.

*Primary Examiner* — Frederick C Nicolas
*Assistant Examiner* — Andrew Bainbridge
(74) *Attorney, Agent, or Firm* — Global Patent Operation; Douglas D. Zhang

(57) ABSTRACT

A dispensing system for an appliance has a main tank for holding a fluid. The main tank controls the temperature of the fluid. A dispenser outlet fluidly is connected to the tank by a dispenser fluid line. An auxiliary tank holds a volume of the fluid. A flow control device selectively moves the fluid held in the auxiliary tank to the main tank then through the dispenser fluid line to the dispenser outlet and selectively removes the fluid remaining in the dispenser fluid line after dispensing.

17 Claims, 4 Drawing Sheets

U.S. PATENT DOCUMENTS

| | | |
|---|---|---|
| 2006/0006107 A1 | 1/2006 | Olson et al. |
| 2007/0068190 A1 | 3/2007 | Venkatakrishnan et al. |
| 2007/0074529 A1 | 4/2007 | Lim |
| 2007/0093936 A1 | 4/2007 | Johnson et al. |
| 2007/0186780 A1 | 8/2007 | Clark |
| 2008/0107410 A1 | 5/2008 | White |

* cited by examiner

US 8,011,537 B2

DISPENSING SYSTEM AND METHOD FOR DISPENSING FLUID IN AN APPLIANCE

BACKGROUND OF THE INVENTION

The present disclosure generally relates to appliances, such as refrigerators, and more particularly relates to a dispensing system and method for dispensing fluid in an appliance. In one embodiment, a refrigerator dispensing system includes a temperature controlled water tank for holding water, a dispenser outlet fluidly connected to the tank by a dispenser fluid line, and a reversible pump that selectively moves the water held in the tank through the dispenser fluid line to the dispenser outlet and selectively removes residual water remaining in the dispenser fluid line after dispensing through the dispenser outlet back into the water tank. The dispensing system and method will be described with particular reference to this embodiment, but it is to be appreciated that it is also amenable to other like applications (e.g., using other fluids, being employed in another type of appliance, etc.).

By way of background, appliances, such as refrigerators, sometimes include a water dispensing system having a water storage tank for storing and cooling water to be dispensed. Further, some water dispensing systems include a water filter connected to the water storage tank and located in a fresh food or freezer food compartment of a refrigerator. Conventional water dispensing systems are usually concerned with the dispensing of cooled water from a refrigerator.

One problem associated with dispensing systems of prior art refrigerators is the handling of residual water remaining in a dispenser fluid line after a portion of water is dispensed through an outlet. It can be difficult to maintain a desired temperature of the residual water remaining in the dispenser fluid line. As a result, the next time water is dispensed through the outlet, the residual water is dispensed for a time before temperature controlled water is dispensed from the tank. Because the residual water is not temperature controlled, the dispensed water, or at least a portion thereof, may be provided at an undesirable temperature.

Another problem is particularly evident where liquid at a higher then ambient temperature is desired. Inefficiencies are experienced where the liquid in the dispenser line transfers heat to the interior of the refrigerator. This transfer of heat reduces the temperature of the liquid and requires additional cooling of the refrigerator compartments.

SUMMARY OF THE INVENTION

According to one aspect, a dispensing system for an appliance is shown. The dispensing system has a main tank for holding a fluid. The main tank controls the temperature of the fluid. A dispenser outlet fluidly connected to the tank by a dispenser fluid line. An auxiliary tank for holds a volume of the fluid. A flow control device selectively moves the fluid held in the auxiliary tank to the main tank then through the dispenser fluid line to the dispenser outlet and selectively removes the fluid remaining in the dispenser fluid line after dispensing.

According to another aspect, a refrigerator with a fluid dispensing system is shown. The fluid dispensing system has a main tank for holding a fluid. The main tank controls the temperature of the fluid. A dispenser outlet is fluidly connected to the tank by a dispenser fluid line. An auxiliary tank holds a volume of the fluid. A flow control device selectively moves the fluid held in the auxiliary tank to the main tank then through the dispenser fluid line to the dispenser outlet. The flow control device selectively removes the fluid remaining in the dispenser fluid line after dispensing to the auxiliary tank.

According to yet another aspect, a method for dispensing temperature controlled water in an appliance is provided. More particularly, in accordance with this aspect, dispensing temperature controlled water through a dispenser line to a dispenser outlet upon receipt of a dispense signal triggered at the dispenser outlet. After dispensing, retracting the temperature controlled water from a main tank to remove the water from the dispenser line and a portion of the water from the main tank to an auxiliary tank.

Still other features and benefits of the present disclosure will become apparent to those skilled in the art upon reading and understanding the following detailed description.

DETAILED DESCRIPTION OF THE INVENTION

Figure 1:
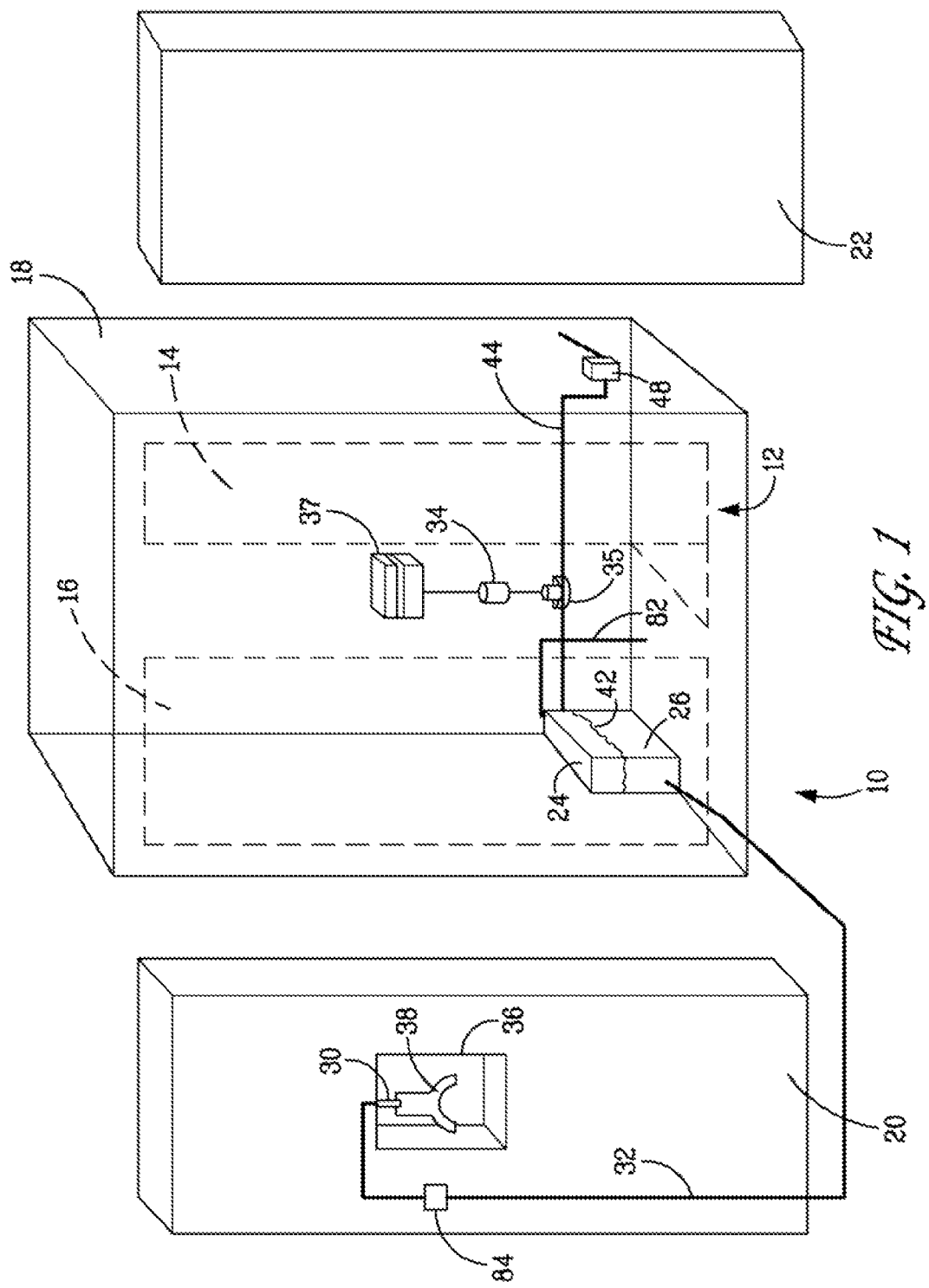
FIG. 1 is an exploded perspective view of a refrigerator having a system for storing and dispensing a temperature controlled fluid.
Figure 5:
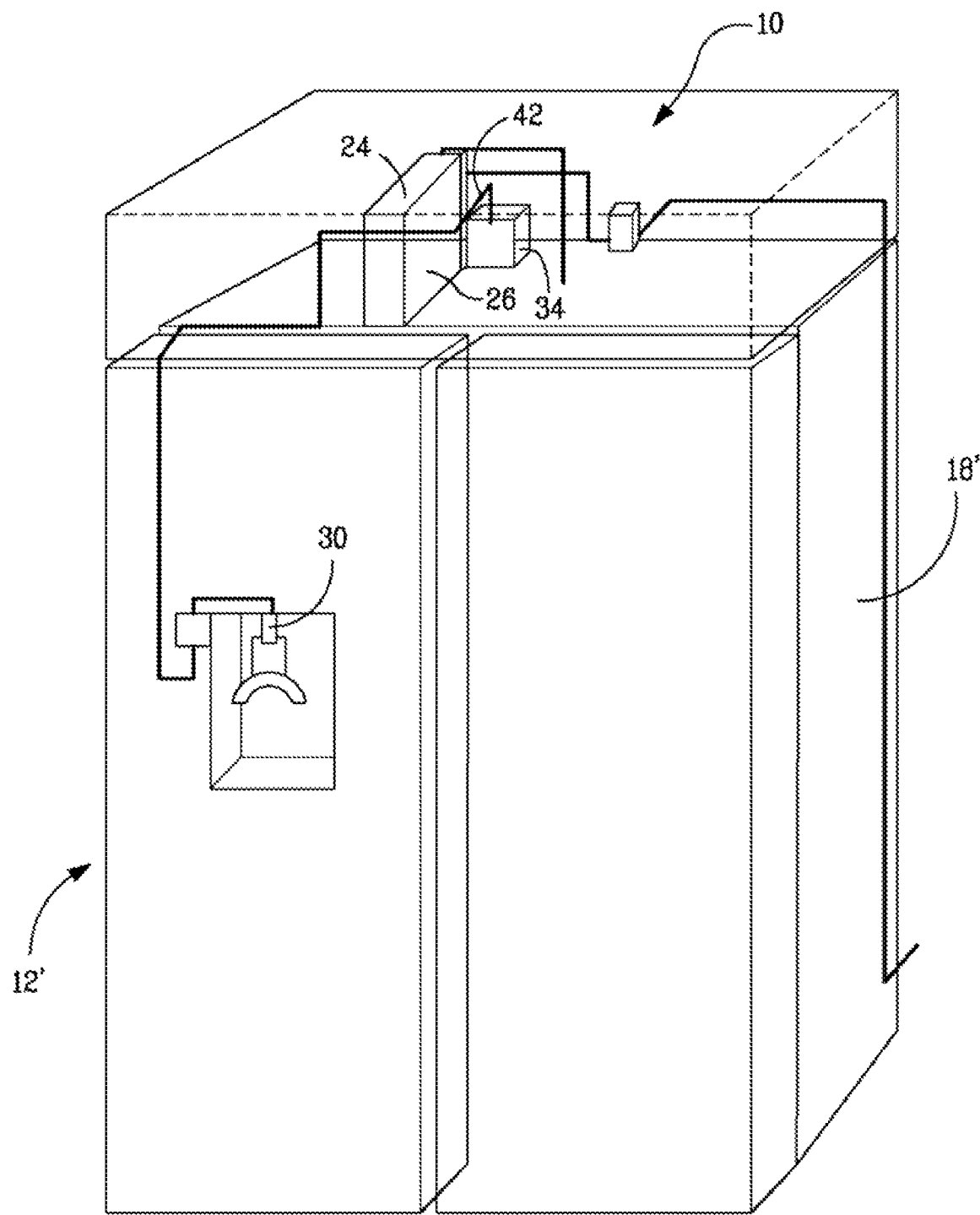
FIG. 5 is a perspective view of an alternate refrigerator having the system for storing and dispensing a temperature controlled fluid.

Referring now to the drawings wherein the showings are for purposes of illustrating one or more exemplary embodiments, FIG. 1 shows a system for storing and dispensing a fluid from an appliance, the system being generally designated by reference numeral 10. In the illustrated embodiment, the appliance with which the system 10 is associated is a refrigerator 12, but it is to be appreciated that the appliance could be any other type of appliance in which it is desirable to deploy the dispensing system 10. The illustrated refrigerator 12 is a side-by-side refrigerator having refrigerated and freezer compartments arranged in side-by-side relation relative to one another. It is to be appreciated that when the appliance is a refrigerator, the refrigerator need not be of the illustrated type. For example, with reference to FIG. 5, the refrigerator can be a side-by-side refrigerator 12' like the refrigerator 12 but with the system 10 primarily disposed in a portion of a refrigerator cabinet 18' located over side-by-side freezer and fresh food compartments and doors therefore. Alternately, the refrigerator can be a side-by-side refrigerator with a bottom freezer drawer or compartment, the refrigerator could have only a single door, or could be of some other configuration or type.

The side-by-side refrigerator 12 of the illustrated embodiment can include a fresh food storage compartment 14 and a freezer storage compartment 16, the compartments 14, 16 arranged in side-by-side relation with one another. The compartments 14, 16 can be contained within or defined by a main refrigerator portion or casing 18. Doors 20, 22 can be respectively disposed over the storage compartments 14, 16. For example, door 20 can be provided over the freezer compartment 16 for providing selective access thereto and likewise door 22 can be provided over the refrigerator compartment 14.

Figure 2:
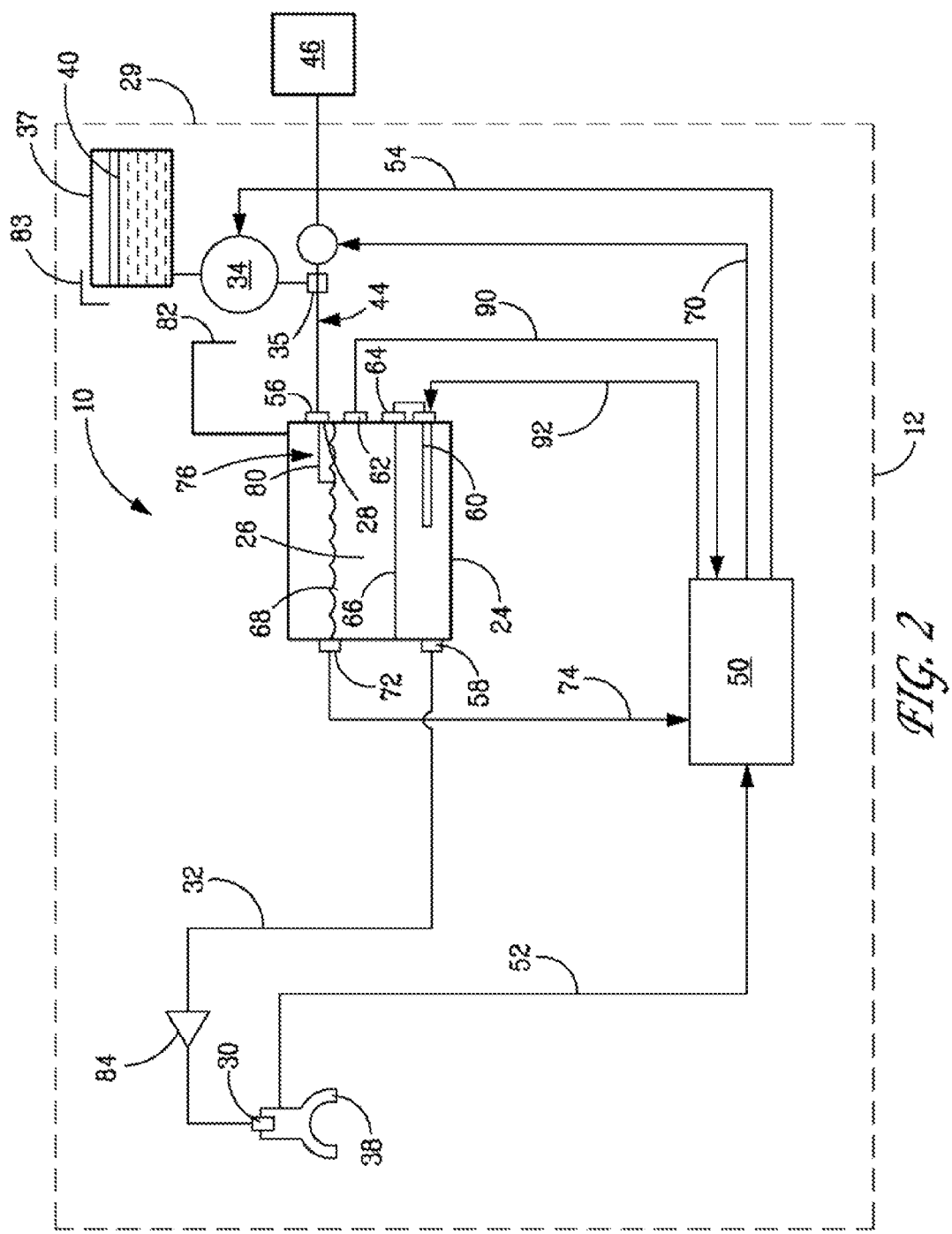
FIG. 2 is a schematic view of the system of FIG. 1 showing a tank fluidly coupled to a dispenser outlet by a dispenser fluid line.

In any configuration, the system 10 can include a temperature controlled main tank 24 for storing a temperature controlled fluid, such as water 26 (FIG. 2). When the temperature controlled main tank 24 is employed, the system 10 is a system for storing and dispensing a temperature controlled fluid. When the temperature controlled fluid is water, the system 10 can be referred to as a water dispensing system and the main tank 24 can be referred to as a temperature controlled water tank for holding water. Of course, it should be appreciated that the fluid need not be limited to water and thus could be some other fluid capable of being temperature controlled by the system 10 as will be described in more detail below.

As shown in FIG. 1, the main tank 24 can be located in a lower rear portion of the main portion or casing 18, which can also be referred to as a main cabinet. In the illustrated embodiment, the main tank 24 is particularly illustrated as being mounted in a rear lower portion of the main cabinet 18 behind the freezer compartment 16. As will be understood and appreciated by those skilled in the art, the mounting location of the main tank 24 can vary. For example, the main tank 24 can be mounted at or near a top of the main cabinet 18 or at some other convenient location.

With additional reference to FIG. 2, the system 10 further includes a dispenser outlet 30 for dispensing the temperature controlled fluid 26 from the main tank 24. In particular, the dispenser outlet 30 is fluidly connected to the main tank 24 by a dispenser fluid line 32. Thus, the dispenser fluid line 32 fluidly couples the main tank 24 and the dispenser outlet 30.

The fluid line 32 can be appropriately sized, at least adjacent the outlet 30, for minimizing dribble at the outlet 30.

The dispenser outlet 30 can be disposed on a door of the refrigerator 12. For example, as shown in the illustrated embodiment, the dispenser outlet 30 is disposed within a dispenser recess 36 defined in the freezer door 20. Alternately, the dispenser outlet 30 can be provided in some other location of the appliance (e.g., refrigerator 12). For example, the dispenser outlet 30 can be disposed on an inside of one of the appliance doors or within the appliance itself (e.g., within one of the compartments 14, 16). The system 10 can further include a dispenser actuator 38 provided in association with the dispenser outlet 30 for generating a dispense signal upon actuation of the actuator 38 As is known and understood by those skilled in the art, the actuator 38 can be a push button or lever disposed immediately behind the outlet 30 for actuation by positioning a glass or cup under the outlet 30 and pressing against the actuator 38.

The system 10 of the illustrated embodiment further includes an inlet fluid line 44 fluidly connecting the main tank 24 to a fluid source 46 (such as a home's water supply line), which can have its own inlet water supply pressure. An inlet valve 48, which can be a solenoid actuated valve, is disposed on the inlet line 44 and serves to prevent fluid from the fluid source 46 from refilling the tank 44 when the pump 34 removes fluid from dispenser fluid line 32 and a portion of the fluid 26 held in the main tank 24 during periods of non-use. The inlet valve 48 also allows fluid from the fluid source 46 to refill the main tank 24 only after fluid held in the auxiliary tank 37 has been moved through the dispenser fluid line 32 to the dispenser outlet 30 and residual fluid in the dispenser fluid line 32 has been removed.

Auxiliary tank 37 is a holding tank for fluid that can be filled and emptied within the system 10. Fluid can be pumped into or out of the auxiliary tank 37 using a reversible pump 34. The reversible pump 34 can be any pump where the pumping or flow directions can be reversed, e.g. any pump where the inlet becomes outlet and the outlet becomes inlet can be called a reversible pump. This can be done either by an internally reversing pump or by an external mechanism. An example of internally reversible pumps are peristaltic pumps or impeller pumps. Examples of external reversing mechanisms include solenoid valves, motorized dampers or motorized valves.

The auxiliary tank 37 and reversible pump 34 arrangement operates within the system in the following fashion. A "T" connector 35 in the inlet line 44 fluidly connects the auxiliary tank 37 between the inlet valve 48 and the main tank 24. When the system 10 is idle, the auxiliary tank 37 is filled with fluid 29. As a user dispenses fluid at the dispenser 36, the reversible pump 34 is powered to pump out all the fluid 29 from the auxiliary tank 37 to the dispenser 36 via main tank 24. When auxiliary tank 37 is empty or pump 34 experiences a lack of fluid the inlet valve 48 is opened. Reversible pump 34 continues to run until the user stops requesting fluid, to prevent cold inlet water from entering into auxiliary tank 37. After the user stops dispensing the inlet valve 48 is closed and reversible pump 34 operates in a reverse direction to pull the water from the dispenser fluid line 32 and also from main tank 24. By withdrawing some fluid from main tank 24, a thermal expansion area is created.

With particular reference to FIG. 2, the system 10 additionally includes a controller 50 linked to the dispenser actuator 38. As will be described in more detail below, the dispenser actuator 38 is capable of generating a dispense signal 52 upon actuation thereof. The controller 50 receives the dispense signal 52 from the dispense actuator 38 and is linked to the pump 34 and the inlet valve 48 for sending command signals (e.g., signals 54, 70) thereto. In particular, the controller 50 can send a pump control signal 54 to the pump 34 to empty or fill auxiliary tank 29.

The command signal 54 for the pump 34 can be referred to as a pump control signal 54. The pump command signal 54 can include a first pump control signal for commanding the pump 34 to operate in a first direction and a second pump control signal commanding the pump 34 to operate in a second, reverse direction. When the controller 50 sends the first pump control signal 54 to the pump 34, the pump moves the fluid 29 held in the auxiliary tank 37 through the main tank 24 and the dispenser fluid line 32 to the dispenser outlet 30. Because it may take an amount of time for the fluid 26 in the main tank 24 to move through the line 32 to the outlet 30 (e.g., five seconds), the system 10 has a predetermined delay period between an initial actuation of the dispenser actuator 38 and when fluid 26 exits the outlet 30. This predetermined delay period that precedes dispensing through the outlet 30 after the dispenser actuator 38 sends the dispense signal 54 to the controller 50 can be advantageous, particularly if the temperature controlled fluid 26 is at an elevated temperature, because it allows a user of the system 10 to prepare for dispensing after actuation of the actuator 38.

When the controller 50 sends the second pump control signal 54 to the pump 34, the pump removes any residual fluid in the dispenser fluid line 32 and a portion of the fluid 26 in main tank 24 sending the same to the auxiliary tank 37. Auxiliary tank 37 may include an outlet 83 to prevent pressurization of auxiliary tank 37. A bladder 40 prevents air from being introduced into the system.

However, it can be appreciated that reversible pump 34 may be incorporated into auxiliary tank 37. Such arraignments include a piston cylinder or solenoid actuated bladder, where the piston or bladder 40 is extended to expel the fluid 29 from the cylinder and retracted to draw fluid into the cylinder.

The main tank 24 includes an inlet 56 fluidly connected to the inlet line 44 for refilling the main tank 24. The main tank 24 additionally includes an outlet 58 fluidly connected to the dispenser fluid line 32. Still further, the main tank 24 includes a temperature conditioning device 60 for adjusting a temperature of the temperature controlled fluid 26 and a thermostatic sensor 62 for sensing the temperature of the fluid 26. The thermostatic sensor 62 can be thermally connected to the fluid 26 and operatively coupled to the temperature-conditioning device 60, such as through the controller 50, for cycling the temperature-conditioning device 60 to adjust the temperature of the fluid 26 to a desired temperature.

In one embodiment, the temperature-conditioning device 60 is a heating element for heating the fluid 26 within the main tank 24 to a predetermined temperature, such as about 150° F. to 205° F. (about 65° C. to 99° C.). The thermostatic sensor 62 can be a thermistor. Alternately, the temperature conditioning device 60 could be a cooling element and could work in conjunction with the thermostatic sensor 62 to maintain the fluid 26 in the main tank 24 at a desired or predetermined cooled temperature, such as about 50° F. (10° C.) for example.

The main tank 24 can further include a high temperature cutout device 64 that prevents actuation or operation of the heating element 60 when a temperature in the main tank 24 is above a predetermined temperature threshold, for example 210° F. (99° C.). The main tank 24 can also include baffles 66, 68 for dispersing fluid delivered from the fluid source 46 through the inlet 56 of the main tank 24. The first baffle 66 can be generally disposed in a plane parallel to a top level of the fluid 26 in the main tank 24 and located vertically along the tank at approximately a location of the high temperature cutout device 64 to expedite heat transfer from the heating element 60 to the high temperature cutout device 64. The second baffle 68 is also generally disposed in a plane parallel to a top level of the fluid 26 in the main tank 24, but is located vertically along the tank at approximately a location of the inlet 56. In one embodiment, the high temperature cutout device 64 is a bi-metal switch that disables the heating element 60 when the temperature in the main tank 24 is above the predetermined temperature threshold and requires manual resetting after activation, though this is not required.

A fluid level sensing device 72 can be provided in association with the main tank 24 for determining when a fluid level in the main tank 24 is below a predetermined level. Through the controller 50, the level sensing device 72 can be used with the inlet valve 48 for controlling refilling of the main tank 24 from the fluid source 46. In particular, the controller 50 can be linked to the level sensing device 72 and to the inlet valve 48 so that the controller 50 can command the inlet valve 48 to open to allow the fluid source 46 to refill the main tank 24 when the level sensing device 72 indicates that the fluid level in the main tank 24 is below the predetermined level, but only after any residual temperature controlled fluid 26 is withdrawn from the dispenser fluid line 32. Specifically, the level sensing device 72 can send a level sensing device signal 74 to the controller 50 for indicating a fluid level within the main tank 24 to the controller 50 or at least indicating that the fluid level in the main tank 24 is below the predetermined level. When the fluid level in the main tank 24 is indicated by the signal 54 as being below the predetermined level and residual fluid in the fluid line 32 has already been removed by the pump 34, the controller 50 can send a command signal 76 to the inlet valve 48 for opening the inlet valve 48 and refilling the main tank 24.

The main tank 24 can additionally include a float valve device 76 including a float valve 78 disposed in the inlet 56 of the main tank 24 and a float 80 connected to the float valve 78. The float valve 78 is normally in an open position allowing fluid communication through the tank inlet 56; however, the float 80 mechanically closes the float valve 78 when the fluid level in the tank is above a second predetermined level (higher than the first predetermined level). More particularly, should too much fluid be in the main tank 24, the float 80 will rise and, when the fluid level reaches or exceeds the second predetermined level, the float 80 will cause the float valve 78 to close, thereby preventing further fluid from the fluid source 46 from entering the main tank 24 through the inlet 56. A vent line 82 can be connected to the tank, preferably at an upper end thereof, for venting air or pressure from the main tank 24 when the fluid level in the tank increases and admitting air into the main tank 24 as the fluid level decreases so as to prevent a vacuum effect from occurring.

Figure 3:
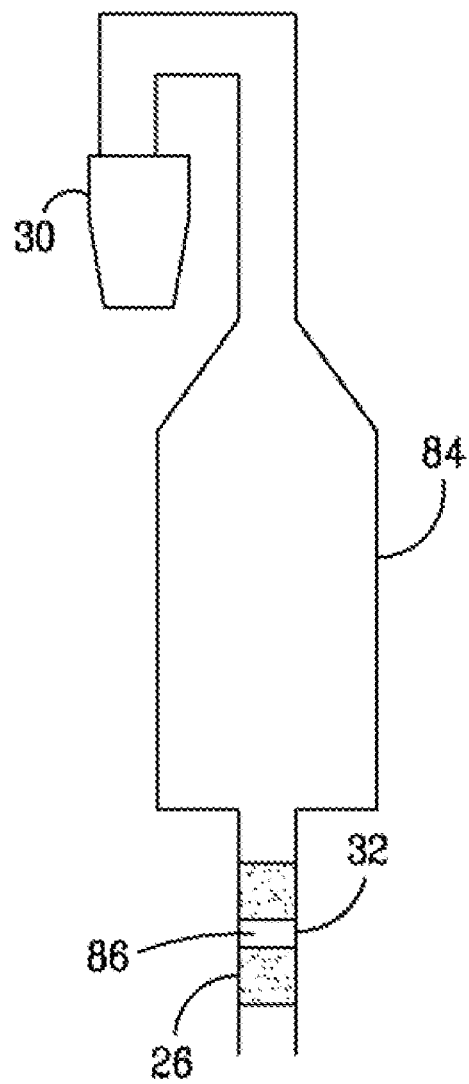
FIGS. 3 and 4 are schematic views of an expansion chamber provided along the dispenser fluid line, the expansion chamber shown prior to dispensing (FIG. 3) and during dispensing (FIG. 4).
Figure 4:
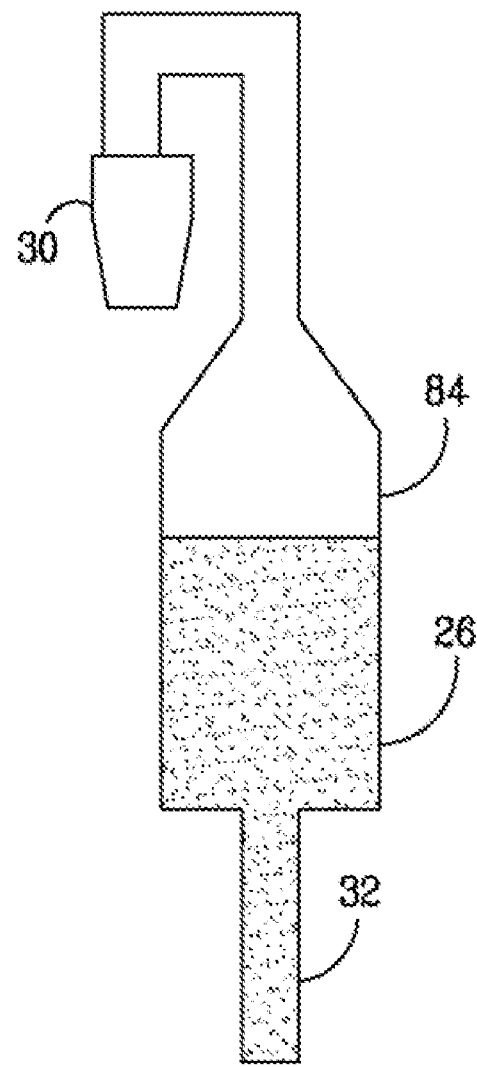

With additional reference to FIGS. 3 and 4, the fluid line 32 includes an expansion chamber 84. The expansion chamber 84 can be disposed along the fluid line 32 adjacent the dispenser outlet 30 to purge any air trapped in the fluid line 32 prior to dispensing the fluid through the dispenser outlet 30. More specifically, as shown in FIG. 3, air gaps 86 may be disposed within the fluid 26 passing through the dispense line 32. Should these air gaps pass to the outlet 30 without going through the expansion chamber 84, the resulting dispense from the outlet could fail to be constant and may cause spitting. The expansion chamber eliminates the air gaps 86, as shown in FIG. 4, and provides a continuous flow of the fluid 26 to the outlet 30.

In operation, particularly when the main tank 24 is a temperature controlled tank, the system 10 allows the appliance 12 to dispense temperature controlled fluid or water without dispensing non-temperature controlled residual fluid and preventing or substantially reducing any dribble effect at the outlet 30. In particular, and with reference to the illustrated embodiment, the temperature controlled fluid 26 is dispensed through the dispenser line 32 to the dispenser outlet 30 upon receipt of the dispense signal 52 triggered at the dispenser outlet 30 by the dispenser actuator 38 (or after a predetermined delay period expires). More specifically, when the controller 50 receives the actuation signal 52, the controller 50 sends a first pump control signal 54 to the pump 34 to move the fluid 29 held in the auxiliary tank 37 through the main tank 24 to the dispenser fluid line 32 to the dispenser outlet 30. The dispensing by the pump 34 is independent and separate from the use of the inlet supply pressure from the fluid source 46 (i.e., the pump serves as an independent dispensing means that is not dependent on a pressure of the fluid 26 at the fluid source 46). More particularly, the pump 34 can be limited to dispensing fluid 29 held in the tank 37 through the dispenser fluid line 32 to the outlet 30 even when the inlet valve 48 is closed thereby ensuring that fluid 26, 29 is dispensed through the outlet 30 independent of the inlet water supply pressure of the water source 46.

After dispensing, any fluid remaining in the dispenser line 32 (i.e., residual fluid) is retracted to remove the fluid from the dispenser line 32. More particularly, when the dispenser actuator 38, also referred herein as a dispenser trigger, is released, the signal 52 to the controller 50 ceases or indicates that no further dispensing is desired. At this time, the controller 50 sends the second command signal 54 to the pump 34 and the pump direction is reversed such that fluid within the tubing 32 is returned to the main tank 24. In one embodiment, retraction of the residual fluid in the dispenser line 32 back into the main tank 24 occurs only when both the dispense signal 52 indicates that dispensing has terminated (or is desired to be terminated) and a predetermined delay period expires. The predetermined delay can be seven seconds, for example, and operates to ensure that dispensing is desired to be ceased and that actuation of the dispenser trigger 38 was not stopped inadvertently.

After retraction, the main tank 24 can be refilled with fluid from the fluid source 46 through the tank inlet 56 after another predetermined delay (e.g., twenty seconds), though this is not required. More specifically, the controller 50 sends the inlet valve control signal 70 to the inlet valve 48 to open the inlet valve and refill the main tank 24. Opening of the valve 48 by the controller 50 works in conjunction with the water level sensor 72 and its corresponding signal 74. More specifically, the water level sensor 72 indicates a water level in the main tank 24 via signal 74. Using this information, the controller 50 determines how long to open the valve 48 to allow fluid from the fluid source 46 to refill the main tank 24. Between dispenses and with the main tank 24 filled, the controller 50 operates the temperature conditioning device 60 to maintain the fluid 26 within the main tank 24 at a desired temperature. More specifically, the sensor 62 provides a temperature signal 90 to the controller 50 and, using this input, the controller 50 sends a command signal 92 to the temperature conditioning device 60 to operate the same and thereby control the temperature of the fluid 26 in the main tank 24. The timed refilling of the main tank 24 allows a maximum amount of the temperature controlled fluid 26 to be maintained within the tank and subsequently withdrawn from the tank prior to introducing additional fluid from the fluid source 46.

The exemplary embodiment or embodiments have been described with reference to preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A dispensing system for an appliance, comprising:
   a main tank for holding a fluid, wherein the main tank controls the temperature of the fluid;
   a dispenser fluid line;
   a dispenser outlet fluidly connected to the main tank by the dispenser fluid line;
   an auxiliary tank or holding a volume of the fluid;
   a flow control device that selectively moves fluid in the main tank into the dispenser fluid line and towards the dispenser outlet by moving fluid in the auxiliary tank into the main tank and after dispensing, selectively removes fluid in the dispenser fluid line away from the dispenser outlet by moving part of fluid in the main tank into the auxiliary tank; and
   an inlet valve disposed on an inlet line fluidly connecting the main tank to a source of the fluid, the inlet valve preventing fluid from the fluid source from refilling the main tank while the flow control device moves the fluid in the auxiliary tank into the main tank and allowing fluid from the fluid source to refill the main tank only after fluid in the main tank is moved through the dispenser fluid line to the dispenser outlet.

2. The dispensing system of claim 1 wherein the flow control device is a reversible pump.

3. The dispensing system of claim 1 wherein the flow control device is a solenoid actuated piston or bladder within the auxiliary tank.

4. The dispenser system of claim 1 wherein the auxiliary tank and the flow control device are disposed between the inlet valve and the main tank.

5. The dispensing system of claim 1 further comprising:
   a dispenser actuator for generating a dispense signal upon actuation thereof; and
   a controller linked to the dispenser actuator to receive the dispense signal and linked to the flow control device to send a control signal, the controller sending the control signal to the flow control device to move the fluid in the auxiliary tank into the main tank upon receipt of the dispense signal from the dispenser actuator.

6. The dispensing system of claim 1 wherein the main tank includes a heating element for heating the fluid within the main tank to a predetermined temperature.

7. The dispensing system of claim 1 wherein the fluid is water.

8. The dispensing system of claim 1 wherein the appliance is a refrigerator.

9. A refrigerator comprising:
   a fluid dispensing system comprising:
      a main tank for holding a fluid, wherein the main tank controls the temperature of the fluid;
      a dispenser fluid line;
      a dispenser outlet fluidly connected to the main tank by the dispenser fluid line;
      an auxiliary tank for holding a volume of the fluid;
      a flow control device that selectively moves fluid in the main tank into, the dispenser fluid line and towards the dispenser outlet by, moving fluid in the auxiliary tank into the main tank and after dispensing, selectively removes fluid in the dispenser fluid line away from the dispenser outlet by moving part of the fluid in the main tank into the auxiliary tank; and
      an inlet valve disposed on an inlet line fluidly connecting the main tank to a source of the fluid, the inlet valve preventing fluid from the fluid source from refilling the main tank while the flow control device moves the fluid in the auxiliary tank into the main tank and allowing fluid from the fluid source to refill the main tank only after fluid in the main tank is moved through the dispenser fluid line to the dispenser outlet.

10. The refrigerator of claim 9 wherein the flow control device is a reversible pump.

11. The refrigerator of claim 9 wherein the flow control device is a solenoid actuated piston or bladder within the auxiliary tank.

12. The refrigerator of claim 9 wherein the auxiliary tank and the flow control device are disposed between the inlet valve and the main tank.

13. The refrigerator of claim 9 further comprising:
   a dispenser actuator for generating a dispense signal upon actuation thereof; and
   a controller linked to the dispenser actuator to receive the dispense signal and linked to the flow control device to send a control, signal, the controller sending, the control signal to the flow control device to move the fluid in the auxiliary tank into the main tank upon receipt of the dispense signal from the dispenser actuator.

14. The refrigerator of claim 9 wherein the main tank includes a heating element for heating the fluid within the main tank to a predetermined temperature.

15. The refrigerator of claim 9 wherein the fluid is water.

16. A method for dispensing temperature controlled water in an appliance, comprising:
   dispensing temperature controlled water through a dispenser line to a dispenser outlet upon receipt of a dispense signal triggered at the dispenser outlet;
   after dispensing, removing the temperature controlled water away from the dispenser outlet by retracting water from a main tank into an auxiliary tank, wherein the main tank is fluidly connected to the dispenser outlet by the dispenser line; and after retracting, refilling the main tank with water through a water inlet after a predetermined delay.

17. The method of claim 16 wherein dispensing temperature controlled water includes pumping water from an auxiliary tank in a first direction into the main tank upon receipt of the dispense signal trigger at the dispenser outlet, and wherein retracting the temperature controlled water includes pumping the water a second, reverse direction from the main tank to the auxiliary tank.

* * * * *